United States Patent
Rusanu et al.

(10) Patent No.: US 11,446,818 B2
(45) Date of Patent: Sep. 20, 2022

(54) RESUMING ROBOTIC PROCESS AUTOMATION WORKFLOWS BASED ON EXTERNAL TRIGGERS

(71) Applicant: UiPath, Inc., New York, NY (US)

(72) Inventors: Remus Rusanu, Redmond, WA (US); Liji Kunnath, Bangalore (IN)

(73) Assignee: UiPath, Inc., New York, NY (US)

( * ) Notice: Subject to any disclaimer, the term of this patent is extended or adjusted under 35 U.S.C. 154(b) by 277 days.

(21) Appl. No.: 16/590,007

(22) Filed: Oct. 1, 2019

(65) Prior Publication Data

US 2021/0094176 A1  Apr. 1, 2021

(51) Int. Cl.
 *B25J 9/16* (2006.01)
 *G06F 9/44* (2018.01)
 *G06F 9/48* (2006.01)

(52) U.S. Cl.
 CPC .............. *B25J 9/1661* (2013.01); *G06F 9/44* (2013.01); *G06F 9/485* (2013.01); *G06F 9/4881* (2013.01)

(58) Field of Classification Search
 None
 See application file for complete search history.

(56) References Cited

U.S. PATENT DOCUMENTS

| | | | |
|---|---|---|---|
| 7,809,525 B2 * | 10/2010 | Chagoly | G06F 11/3495 702/182 |
| 8,103,713 B2 | 1/2012 | Khodabakchian et al. | |
| 8,375,389 B2 | 2/2013 | Allen et al. | |
| 8,548,627 B2 * | 10/2013 | Ulmer | G05B 19/4186 700/246 |
| 10,380,627 B2 * | 8/2019 | Kest | H04L 63/1491 |
| 10,682,761 B2 * | 6/2020 | Geffen | G05B 23/0294 |
| 10,860,905 B1 * | 12/2020 | Gligan | G06V 10/235 |
| 10,915,923 B2 * | 2/2021 | Kest | G06Q 30/0248 |
| 11,157,855 B2 * | 10/2021 | Parimelazhagan | G06F 16/951 |
| 11,281,936 B2 * | 3/2022 | Ma | G06F 11/3438 |
| 2003/0233341 A1 | 12/2003 | Taylor et al. | |
| 2007/0129847 A1 * | 6/2007 | Ulmer | G05B 19/4186 700/245 |
| 2010/0064357 A1 | 3/2010 | Baird et al. | |
| 2010/0153482 A1 | 6/2010 | Kim et al. | |
| 2013/0212129 A1 | 8/2013 | Lawson et al. | |

(Continued)

FOREIGN PATENT DOCUMENTS

KR  10-2012-0064486 A  6/2012

OTHER PUBLICATIONS

Ha et al. "Service-Oriented Integration of Networked Robots with Ubiquitous Sensors and Devices Using the Semantic Web Services Technology", 2005 IEEE, 6 pages.*

(Continued)

*Primary Examiner* — Van H Nguyen
(74) *Attorney, Agent, or Firm* — Volpe Koenig

(57) ABSTRACT

A computer system that generates a universal resource locator (URL). The URL is associated with resuming at least one automated process of a running workflow process that includes a plurality of automated processes. The URL is provided to an external system/application. An input of the URL is received from the external system/application, in response to a trigger event at the external system/application. Based on the input of the URL, the at least one automated process is resumed by at least one headless robot.

20 Claims, 5 Drawing Sheets

(56) References Cited

U.S. PATENT DOCUMENTS

| | | |
|---|---|---|
| 2014/0372324 A1 | 12/2014 | Mercuri |
| 2015/0206079 A1 | 7/2015 | Sanabria et al. |
| 2018/0197123 A1* | 7/2018 | Parimelazhagan ........................ G06Q 10/0633 |
| 2019/0087395 A1* | 3/2019 | Priestas ................. G06F 40/169 |
| 2019/0286736 A1* | 9/2019 | Sturtivant ........... G06F 16/2358 |
| 2020/0004798 A1* | 1/2020 | Weinert, Jr. .......... G06F 16/958 |

OTHER PUBLICATIONS

Maenpaa et al. "A Distributed Architecture for Executing Complex Tasks with Multiple Robots", 2004 IEEE, pp. 3449-3455.*

Hitomi et al., "Distributed Workflow using HTTP: Example using Software Pre-requirements," (Dec. 31, 1998).

* cited by examiner

RESUMING ROBOTIC PROCESS AUTOMATION WORKFLOWS BASED ON EXTERNAL TRIGGERS

BACKGROUND

Long running workflows are persistent workflows that can last for long periods of time, such as hours, days or months to perform a desired software function. An example of such a function is an approval process. These workflows can work with external systems or applications. To perform the long running workflows, fragmented automated processes/jobs can be stitched together to achieve the long running behavior of the workflow.

It is desirable to have more efficient interaction between these workflows and the external environment/applications in a robotic process automation environment.

SUMMARY

A computer system generates a universal resource locator (URL). The URL is associated with resuming at least one automated process of a running workflow process that includes a plurality of automated processes. The URL is provided to an external system/application. An input of the URL is received from the external system/application, in response to a trigger event at the external system/application. Based on the input of the URL, the at least one automated process is resumed by at least one headless robot.

BRIEF DESCRIPTION OF THE DRAWING(S)

A more detailed understanding may be had from the following description, given by way of example in conjunction with the accompanying drawings, wherein like reference numerals in the figures indicate like elements, and wherein.

DETAILED DESCRIPTION

For the methods and processes described below the steps recited may be performed out of sequence in any order and sub-steps not explicitly described or shown may be performed. In addition, "coupled" or "operatively coupled" may mean that objects are linked but may have zero or more intermediate objects between the linked objects. Also, any combination of the disclosed features/elements may be used in one or more embodiments. When using referring to "A or B", it may include A, B, or A and B, which may be extended similarly to longer lists. When using the notation X/Y it may include X or Y. Alternatively, when using the notation X/Y it may include X and Y. X/Y notation may be extended similarly to longer lists with the same explained logic.

Figure 1A:
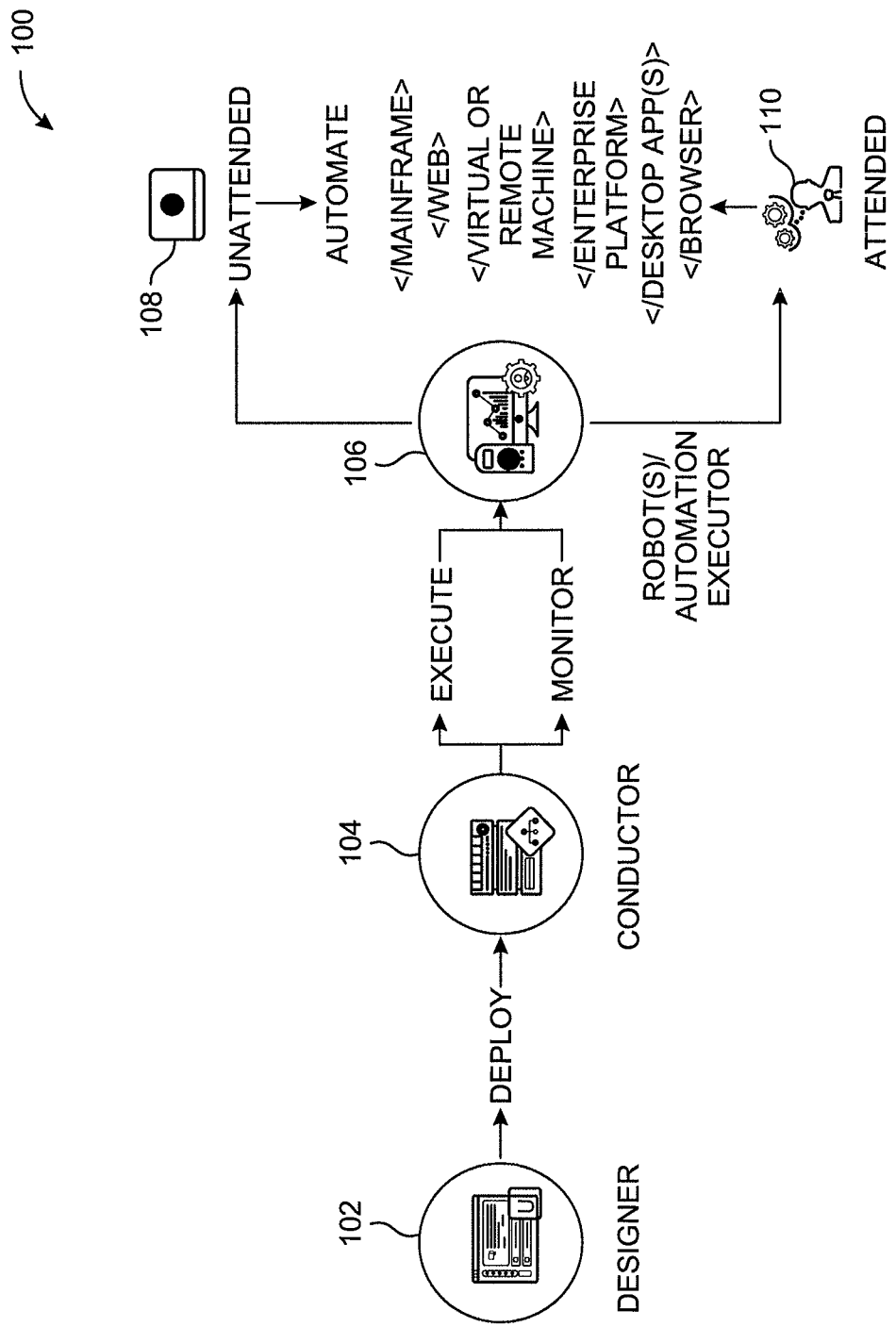
FIG. 1A is an illustration of robotic process automation (RPA) development, design, operation, or execution.

FIG. 1A is an illustration of robotic process automation (RPA) development, design, operation, or execution 100. Designer 102, sometimes referenced as a studio, development platform, development environment, or the like may be configured to generate code, instructions, commands, or the like for a robot to perform or automate one or more workflows. From a selection(s), which the computing system may provide to the robot, the robot may determine representative data of the area(s) of the visual display selected by a user or operator. As part of RPA, shapes such as squares, rectangles, circles, polygons, freeform, or the like in multiple dimensions may be utilized for UI robot development and runtime in relation to a computer vision (CV) operation or machine learning (ML) model.

Non-limiting examples of operations that may be accomplished by a workflow may be one or more of performing login, filling a form, information technology (IT) management, or the like. To run a workflow for UI automation, a robot may need to uniquely identify specific screen elements, such as buttons, checkboxes, text fields, labels, etc., regardless of application access or application development. Examples of application access may be local, virtual, remote, cloud, Citrix®, VMWare®, VNC®, Windows® remote desktop, virtual desktop infrastructure (VDI), or the like. Examples of application development may be win32, Java, Flash, hypertext markup language ((HTML), HTML5, extensible markup language (XML), Javascript, C #, C++, Silverlight, or the like.

A workflow may include, but are not limited to, task sequences, flowcharts, Finite State Machines (FSMs), global exception handlers, or the like. Task sequences may be linear processes for handling linear tasks between one or more applications or windows. Flowcharts may be configured to handle complex business logic, enabling integration of decisions and connection of activities in a more diverse manner through multiple branching logic operators. FSMs may be configured for large workflows. FSMs may use a finite number of states in their execution, which may be triggered by a condition, transition, activity, or the like. Global exception handlers may be configured to determine workflow behavior when encountering an execution error, for debugging processes, or the like.

A robot may be an application, applet, script, or the like, that may automate a UI transparent to an underlying operating system (OS) or hardware. At deployment, one or more robots 204 may be managed, controlled, or the like by a conductor 104, sometimes referred to as an orchestrator 202. Conductor 104 may instructor command robot(s) or automation executor 106 to execute or monitor a workflow in a mainframe, web, virtual machine, remote machine, virtual desktop, enterprise platform, desktop app(s), browser, or the like client, application, or program. Conductor 104 may act as a central or semi-central point to instruct or command a plurality of robots 204 to automate a computing platform.

In certain configurations, conductor 104 may be configured for provisioning, deployment, configuration, queueing, monitoring, logging, and/or providing interconnectivity. Provisioning may include creating and maintenance of connections or communication between robot(s) or automation executor 106 and conductor 104. Deployment may include assuring the delivery of package versions to assigned robots 204 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 104 may provide interconnectivity by acting as the centralized point of communication for third-party solutions and/or applications.

Robot(s) or automation executor 106 may be configured as unattended 108 or attended 110. For unattended 108 operations, automation may be performed without third party inputs or control. For attended 110 operation, automation may be performed by receiving input, commands, instructions, guidance, or the like from a third party component.

A robot(s) or automation executor 106 may be execution agents that run workflows built in designer 102. A commercial example of a robot(s) for UI or software automation is UiPath Robots™. In some embodiments, robot(s) or automation executor 106 may install the Microsoft Windows® Service Control Manager (SCM)-managed service by default. As a result, such robots can open interactive Windows® sessions under the local system account, and have the rights of a Windows® service.

In some embodiments, robot(s) or automation executor 106 may be installed in a user mode. These robots may have the same rights as the user under which a given robot is installed. This feature may also be available for High Density (HD) robots, which ensure full utilization of each machine at maximum performance such as in an HD environment.

In certain configurations, robot(s) or automation executor 106 may be split, distributed, or the like into several components, each being dedicated to a particular automation task or activity. Robot components may include SCM-managed robot services, user mode robot services, executors, agents, command line, or the like. SCM-managed robot services may manage or monitor Windows® sessions and act as a proxy between conductor 104 and the execution hosts (i.e., the computing systems on which robot(s) or automation executor 106 is executed). These services may be trusted with and manage the credentials for robot(s) or automation executor 106.

User mode robot services may manage and monitor Windows® sessions and act as a proxy between conductor 104 and the execution hosts. User mode robot services may be trusted with and manage the credentials for robots 130. A Windows® application may automatically be launched if the SCM-managed robot service is not installed.

Executors may run given jobs under a Windows® session (i.e., they may execute workflows). Executors may be aware of per-monitor dots per inch (DPI) settings. Agents may be Windows® Presentation Foundation (WPF) applications that display available jobs in the system tray window. Agents may be a client of the service. Agents may request to start or stop jobs and change settings. The command line may be a client of the service. The command line is a console application that can request to start jobs and waits for their output.

In configurations where components of robot(s) or automation executor 106 are split as explained above helps developers, support users, and computing systems more easily run, identify, and track execution by each component. Special behaviors may be configured per component this way, such as setting up different firewall rules for the executor and the service. An executor may be aware of DPI settings per monitor in some embodiments. As a result, workflows may be executed at any DPI, regardless of the configuration of the computing system on which they were created. Projects from designer 102 may also be independent of browser zoom level. For applications that are DPI-unaware or intentionally marked as unaware, DPI may be disabled in some embodiments.

Figure 1B:
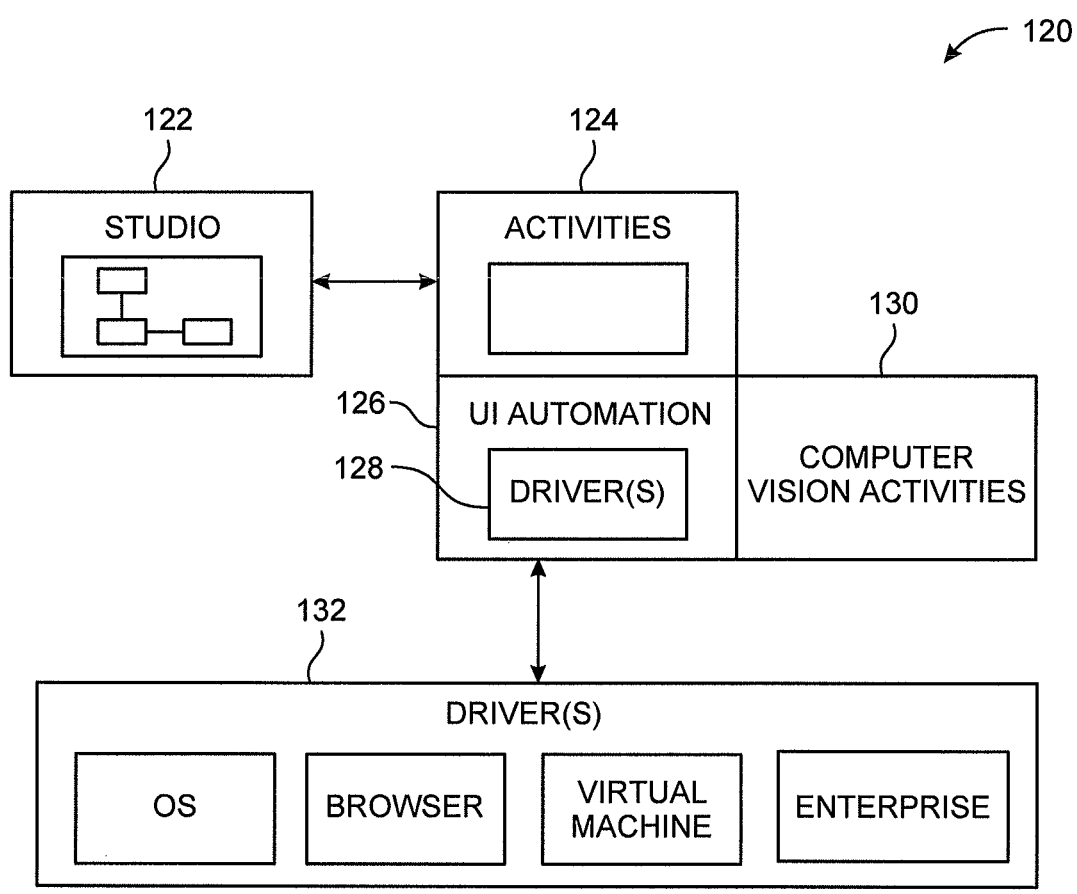
FIG. 1B is another illustration of RPA development, design, operation, or execution.

FIG. 1B is another illustration of RPA development, design, operation, or execution 120. A studio component or module 122 may be configured to generate code, instructions, commands, or the like for a robot to perform one or more activities 124. User interface (UI) automation 126 may be performed by a robot on a client using one or more driver(s) components 128. A robot may perform activities using computer vision (CV) activities module or engine 130. Other drivers 132 may be utilized for UI automation by a robot to get elements of a UI. They may include OS drivers, browser drivers, virtual machine drivers, enterprise drivers, or the like. In certain configurations, CV activities module or engine 130 may be a driver used for UI automation.

Figure 1C:
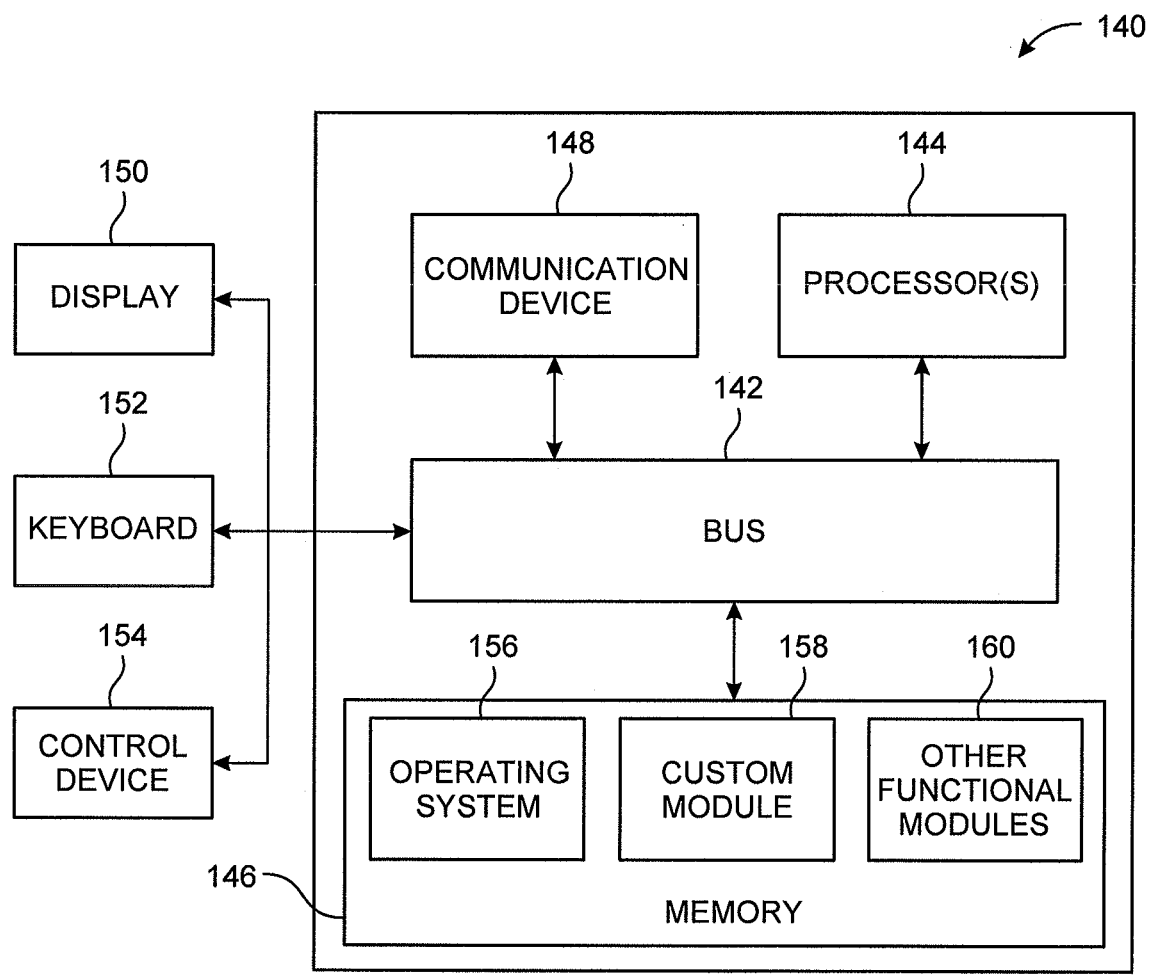
FIG. 1C is an illustration of a computing system or environment.

FIG. 1C is an illustration of a computing system or environment 140 that may include a bus 142 or other communication mechanism for communicating information or data, and one or more processor(s) 144 coupled to bus 142 for processing. One or more processor(s) 144 may be any type of general or specific purpose processor, including a central processing unit (CPU), application specific integrated circuit (ASIC), field programmable gate array (FPGA), graphics processing unit (GPU), controller, multi-core processing unit, three dimensional processor, quantum computing device, or any combination thereof. One or more processor(s) 144 may also have multiple processing cores, and at least some of the cores may be configured to perform specific functions. Multi-parallel processing may also be configured. In addition, at least one or more processor(s) 144 may be a neuromorphic circuit that includes processing elements that mimic biological neurons.

Memory 146 may be configured to store information, instructions, commands, or data to be executed or processed by processor(s) 144. Memory 146 can be comprised of any combination of random access memory (RAM), read only memory (ROM), flash memory, solid-state memory, cache, static storage such as a magnetic or optical disk, or any other types of non-transitory computer-readable media or combinations thereof. Non-transitory computer-readable media may be any media that can be accessed by processor(s) 144 and may include volatile media, non-volatile media, or the like. The media may also be removable, non-removable, or the like.

Communication device 148, may be configured as a frequency division multiple access (FDMA), single carrier FDMA (SC-FDMA), time division multiple access (TDMA), code division multiple access (CDMA), orthogonal frequency-division multiplexing (OFDM), orthogonal frequency-division multiple access (OFDMA), Global System for Mobile (GSM) communications, general packet radio service (GPRS), universal mobile telecommunications system (UMTS), cdma2000, wideband CDMA (W-CDMA), high-speed downlink packet access (HSDPA), high-speed uplink packet access (HSUPA), high-speed packet access (HSPA), long term evolution (LTE), LTE Advanced (LTE-A), 802.11x, Wi-Fi, Zigbee, Ultra-WideBand (UWB), 802.16x, 802.15, home Node-B (HnB), Bluetooth, radio frequency identification (RFID), infrared data association (IrDA), near-field communications (NFC), fifth generation (5G), new radio (NR), or any other wireless or wired device/transceiver for communication via one or more antennas. Antennas may be singular, arrayed, phased, switched, beamforming, beamsteering, or the like.

One or more processor(s) 144 may be further coupled via bus 142 to a display device 150, such as a plasma, liquid crystal display (LCD), light emitting diode (LED), field emission display (FED), organic light emitting diode (OLED), flexible OLED, flexible substrate displays, a projection display, 4K display, high definition (HD) display, a Retina© display, in-plane switching (IPS) or the like based display. Display device 150 may be configured as a touch, three dimensional (3D) touch, multi-input touch, or multi-touch display using resistive, capacitive, surface-acoustic wave (SAW) capacitive, infrared, optical imaging, dispersive signal technology, acoustic pulse recognition, frustrated total internal reflection, or the like as understood by one of ordinary skill in the art for input/output (I/O).

A keyboard 152 and a control device 154, such as a computer mouse, touchpad, or the like, may be further coupled to bus 142 for input to computing system or environment 140. In addition, input may be provided to computing system or environment 140 remotely via another computing system in communication therewith, or computing system or environment 140 may operate autonomously.

Memory 146 may store software components, modules, engines, or the like that provide functionality when executed or processed by one or more processor(s) 144. This may include an OS 156 for computing system or environment 140. Modules may further include a custom module 158 to perform application specific processes or derivatives thereof. Computing system or environment 140 may include one or more additional functional modules 160 that include additional functionality.

Computing system or environment 140 may be adapted or configured to perform as a server, an embedded computing system, a personal computer, a console, a personal digital assistant (PDA), a cell phone, a tablet computing device, a quantum computing device, cloud computing device, a mobile device, a fixed mobile device, a smart display, a wearable computer, or the like.

In long running workflows environments, multiple fragmented automated processes/jobs are stitched together. The processes/jobs are suspended and resumed at different instances adding long running behavior to the workflow. The resumption of the processes/jobs can be triggered by external triggers such as a trigger from an external system/application 206, such as SAPInvoice completion, Salesforce Trigger or others.

Long running workflows are referred to in the following as an orchestration process. The orchestration process is a centralized approach for long running workflows. However, the techniques for an orchestration process can be applied to decentralized processes. The orchestration process contains a limited set of activities to start with, primarily to support long running capabilities. The orchestration process is executed by robots 204, such as in robot farms. Additional activities are added to this process type after certifying them to be serializable as to work alongside with long running activities. The workflow context may be serialized and persisted in a central store. Orchestration process may include long running activities that can be invoked in Async-Non blocking way as well as normal non-UI activities that could be invoked in a Sync-Blocking or Async-Blocking manner.

The orchestration process may be configured to be executed in a bot environment of headless robots 204. Headless robots 204 are unattended bots 204 that perform tasks independent of human involvement. Headless robots 204 typically are programmed to start automatically on a schedule or in response to triggered events. Although the following is described in the context of headless robots 204, some of the embodiments are applicable to non-headless robots 204.

Bots 204 are able to execute processes/jobs with long running activities with the relevant workflow context passed to them from an orchestrator 202 (start job or schedule job or orchestrator queues), which is able to execute multiple instances of orchestration processes using the bots 204.

Figure 2:
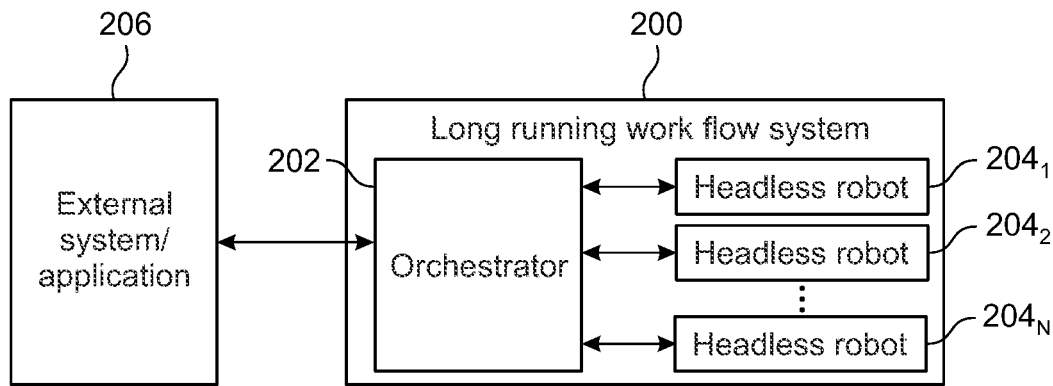
FIG. 2 is a simplified illustration of interaction between an external system/application and a running workflow process system.

FIG. 2 is a simplified diagram illustrating the workflow processing system. A long running workflow system 200 includes an orchestrator 202 and headless robots 2041-204N (204). The orchestrator 202 communicates with and manages the headless robots 204 to perform the long running workflow, such as an approval process. Examples long running workflows include Invoice processing GL code approvals, Quote discount approval process, validation scenarios where Robot processed content needs to be validated by Human for auditing purpose or in case of low confidence score, insurance claim process, employee on-boarding process. Some parts of the above mentioned long running workflows including human actions could be executed in other third-party systems based on which an RPA workflow has to be resumed for its end to end completion. The orchestrator 202 also communicates with an external system or application 206. The orchestrator 202 in the system of FIG. 2 is illustrate as performing a centralized operation of the workflow. However, the following embodiments include signaling that can be applied to non-centralized workflow systems. For example, long running workflows can be executed decentralized in buy bots 204 (unattended—normal or headless). Although FIG. 2 depicts a long running workflows system that shows headless Robots 204 being included in a central system, Another approach is to execute parts of a long running workflow in robots 204 (client machines) and coordinate the workflow state in a central persistence within orchestrator 202. Whenever a long running step is completed (internal or external), the workflow is resumed in any available bot 204 in the same Robot farm.

Figure 3:
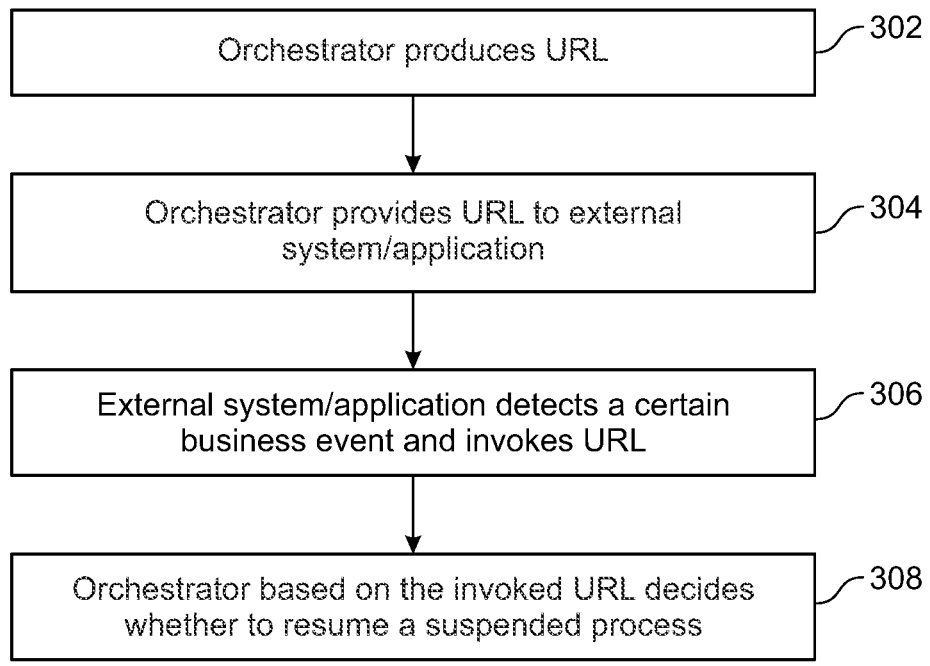
FIG. 3 is a flow diagram of resuming robotic process(es) using a universal resource locator, URL.

FIG. 3 is a flow diagram of an embodiment of resuming robotic processes based on external triggers using a URL. This unique URL can resume a specific instance of a long running process from a specific suspended step. The orchestrator 202 produces a URL, 302, and provides the URL to the external system/application 206, 304. In response to certain business event(s), the external system/application 206 invokes the URL. 306. The orchestrator 202, based on the invoked URL, decides whether to resume a suspended or marked idle process for execution by the headless robots 204, 308. Although FIG. 3 refers to a URL, other addressing techniques can be used, such as an Internet Protocol address, a medium access control (MAC) address, network address and others.

Figure 4:
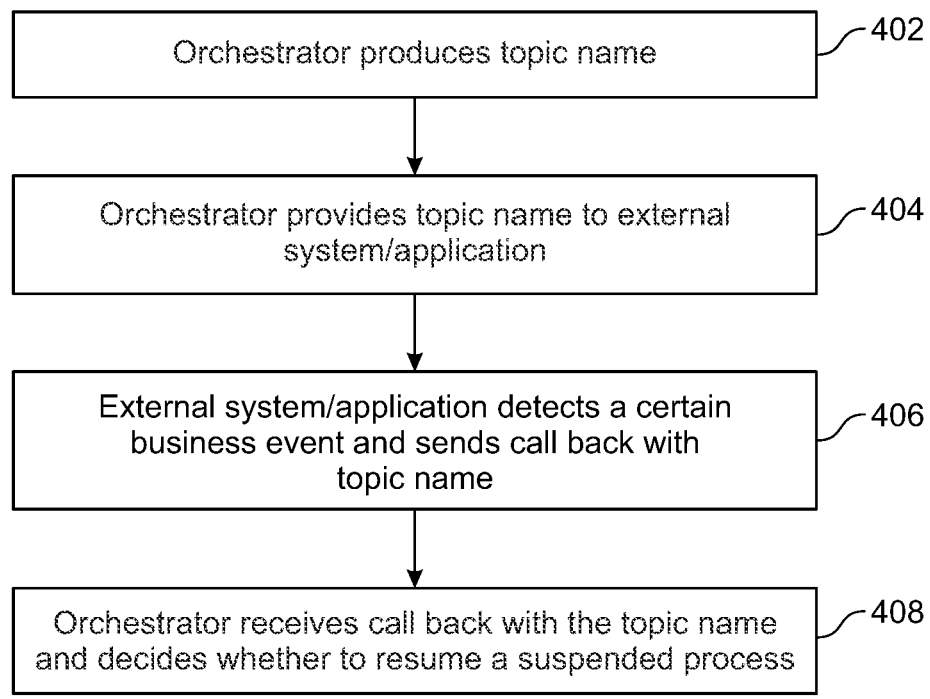
FIG. 4 is a flow diagram of resuming robotic process(es) using a topic name.

FIG. 4 is a flow diagram of an embodiment of resuming robotic processes based on external triggers using a topic name. A topic name-based resumption technique can be used to resume multiple instances of long running workflows suspended at various steps in an orchestrator instance. The orchestrator 202 produces a topic name, 402, and provides the topic name to the external system/application 206, 404. In response to certain business event(s), the external system/application 206 sends a callback to the orchestrator 202 with the topic name, 406. The orchestrator 202, based on the topic name, decides whether to resume a suspended or marked idle process for execution by the headless robots 204, 408. The following list of activities allows a user to add triggers to the workflow/orchestration process. Create External Trigger: Create External Trigger activity is invoked specific to an external system 206 and for a specific job. An external trigger is created by a textual identifier that an RPA developer provides to map to the external trigger (such as SAP-Invoice completion, Salesforce Trigger or others). A potential output of the activity is a URL, such as a SubscriberURL, that can contain the URL generated by orchestrator 202, which is invoked by external system 206 based on some business event that should resume a job.

Resume With External Trigger: the Resume with External Trigger activity takes the subscriberURL as input. The process is suspended or marked Idle until the configured external trigger happens based on which the orchestrator 202 can resume set of job(s) waiting for this trigger.

Alternately, a topic name can be given in the workflow. When a callback is received for the given topic, the workflows waiting on the topic are resumed.

The following are potential requirements for robot and orchestrator components for runtime execution of orchestration process:

1 Execute orchestration process in headless Bots 204 as per the jobs schedule or start job: orchestration process may be configured to be executed in a Bot environment of headless Robots 204; Bots 204 are able to execute processes (jobs) with long running activities with the relevant workflow context passed to them from orchestrator 202 (start job or schedule job or orchestrator queues).

2 Execute concurrent instances of orchestration process: It may be possible to execute multiple instances of orchestration process in headless Robots 204.

3 Ability to mark a workflow execution as 'Idle,' or as 'suspended' state in an orchestrator, at specific activities in a flow: bBot may be able to invoke persistent service to store the workflow context at which the current job can be marked as Idle; bot may be signaled by the activity logic to initiate workflow persistence at a particular step; there may be no active instance waiting on any other sub-process/job to be completed; this Bot may be assigned to perform execution of another job of the same or different workflow meanwhile as per the server load and config; the same workflow instance may be 'idle' at multiple steps as per the process definition.

4 Ability to resume workflow execution upon completion of persistent activity (long running task): bots 204 are able to resume execution of long running job with a merged business context upon completion of Human task or any other long running activity; based on events to trigger resume flow, persistence service may retrieve the exact workflow context and allocate any robot in the assigned environment to execute rest of the workflow instance; resume flow may be invoked with the same package version with which the flow was set to 'Idle' state, even if there is a new version of package available and process created; logs and state has to be maintained for the same job identifier, thus creating a long running workflow job from start to end of the process.

5 Ability resume workflow execution based on Wait for All, Wait for Any or Wait for Any #Semantics: orchestrator 202 can indicate robot to resume such a job, only after receiving call backs from all the activities that the process is waiting on; orchestrator 202 is able to synchronize various parallel branches before invoking resume call.

6 Reliable handover of workflow context between Robot and server: bots 204 are able to recover from any failure while posting the workflow context to the persistence service with an internal re-try mechanism before marking the job as faulted.

7 Resume process prioritization for Robot that executed an earlier step: persistence workflow engine are able to prioritize robots 204 within a specific environment, that has executed part of the same workflow before a the process went in to 'Idle' state while resuming the flow.

8 New state 'Idle' or 'suspended' and 'Pending Resume' or 'Resumed' for Orchestration Process: when an orchestration process is executing a long running step (like a task), the job status may be shown as 'Idle'; once the task completed event triggers orchestrator call back, the job status changes from 'Idle' to 'Running' or 'Pending Resume'; a job can move in to 'Idle' state many number of times during its execution; "pending resume' may be a new state when an 'Idle' job has been resumed based on all dependent bookmark completion, but pending based on Bot availability; this status has to be reflected in the orchestrator 202 monitoring for Jobs and Robots 204, Orchestrator Jobs and Robot list view.

9 Error handling and re-try mechanism during communication between Robot and other servers: handle errors and re-try mechanisms during Robot to workflow persistence service, task management service and during resume jobs invocation.

10 Event Trigger: create jobs: orchestrator 202 are be able to create a job from Orchestrator Jobs view.

11 Event Trigger: job schedule: orchestrator 202 user are able to schedule job execution from Orchestrator schedules view.

The following are potential requirements for robot service:

1 Persistence capability in UiPath.Executor.exe: UiPath.Executor.exe hosts the workflows that execute on the robot client; with the introduction of new long running activities, the activities can invoke create bookmark, which can raise a persistence event; UiPath.Executor.exe needs changes to handle persistence and all the supporting events and send that data to the new persistence service endpoint which can be exposed by the Orchestrator team so as to mark orchestration job as 'Idle' with the right workflow context and bookmark info.

2 Resume job capability in UiPath Robot Service and UiPath.Executor.exe: to support resumption of an idle job, UiPath Robot Service may have the capability to pass on the required information to the Executor upon a resume callback event handling (either by task management system upon task completion or by orchestrator 202 for job completion/queue item execution complete) and UiPath.Executor.exe to load the workflow based on the Process info and resume the job (with the same identifier based on the given Bookmark.

Potential advantages of these embodiments for automation workflows based on event triggering is to bring-in the capability of executing multiple instances of orchestration process in headless Robots 204 co-ordinated centrally. Persistent step/activity within orchestration process can also be executed in any different Robot (co-ordinated centrally but decentralized execution). Also, resource allocation can be improved while executing long running workflows without the need of continuous monitoring or waiting by a Bot. It also allows for the ability to track a process execution instance with a link to all the underlying jobs that were executed during the process.

In the examples given herein, modules may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may be at least partially implemented in software for execution by various types of processors. An identified unit of executable code may include one or more physical or logical blocks of computer instructions that may, for instance, be organized as an object, procedure, routine, subroutine, or function. Executables of an identified module co-located or stored in different locations such that, when joined logically together, comprise the module.

A module of executable code may be a single instruction, one or more data structures, one or more data sets, a plurality of instructions, or the like distributed over several different code segments, among different programs, across several memory devices, or the like. Operational or functional data may be identified and illustrated herein within modules, and may be embodied in a suitable form and organized within any suitable type of data structure.

In the examples given herein, a computer program may be configured in hardware, software, or a hybrid implementation. The computer program may be composed of modules that are in operative communication with one another, and to pass information or instructions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A system, comprising:
    one or more processors;
    a memory coupled to the one or more processors and storing program instructions that when executed by the one or more processors cause the one or more processors to perform:
    suspend at least one automated process of a running workflow process and generate a universal resource locator (URL), wherein the generated URL is associated with resuming the at least one suspended automated process, wherein the running workflow process includes a plurality of automated processes;
    send the generated URL to an external system/application;
    receive, in response to a trigger event at the external system/application, an input of the generated URL from the external system/application; and
    based on the input of the generated URL, resume the at least one automated process by at least one headless robot,
    wherein the at least one headless robot is an unattended robot that performs tasks independent of human involvement and the at least one headless robot is programmed to start automatically based on the received URL generated in response to the triggered event.

2. The system of claim 1 wherein the at least one automated process is marked idle.

3. The system of claim 1 wherein the at least one automated process is a set of automated processes and the based on the input of the generated URL, resume the set of automated processes.

4. The system of claim 1 wherein the system performs a centralized running workflow process.

5. The system of claim 1 wherein the running workflow process is a long term running workflow process.

6. The system of claim 1 wherein reception of the input of the generated URL is in response to a business event determined by the external system/application.

7. The system of claim 1 wherein the running workflow process is persistent.

8. A method comprising:
    suspending, by a processor, at least one automated process of a running workflow process;
    generating, by the processor, a universal resource locator (URL), wherein the URL is associated with resuming the at least one suspended automated process, wherein the running workflow process includes a plurality of automated processes;
    sending, by the processor, the generated URL to an external system/application;
    receiving, by the processor in response to a trigger event at the external system/application, an input of the generated URL from the external system/application; and
    resuming, by the processor based on the input of the generated URL, the at least one suspended automated process by at least one headless robot,
    wherein the at least one headless robot is an unattended robot that performs tasks independent of human involvement and the at least one headless robot is programmed to start automatically based on the received URL generated in response to the triggered event.

9. The method of claim 8 wherein the at least one automated process is marked idle.

10. The method of claim 8 wherein the at least one automated process is a set of automated processes and the based on the input of the generated URL, resuming the set of automated processes.

11. The method of claim 8 wherein the running workflow process is a centralized running workflow process.

12. The method of claim 8 wherein the running workflow process is a long term running workflow process.

13. The method of claim 8 wherein receiving of the input of the generated URL is in response to a business event determined by the external system/application.

14. The method of claim 8 wherein the running workflow process is persistent.

15. A least one non-transient computer readable medium containing program instructions for causing at least one processor to perform the method of:
    suspending at least one automated process of a running workflow process;
    generating a universal resource locator (URL), wherein the URL is associated with resuming the at least one suspended automated process, wherein the running workflow process includes a plurality of automated processes;
    sending the generated URL to an external system/application;
    receiving, in response to a trigger event at the external system/application, an input of the generated URL from the external system/application; and resuming, based on the input of the generated URL, the at least one suspended automated process by at least one headless robot, wherein the at least one headless robot is an unattended robot that performs tasks independent of human involvement and the at least one headless robot is programmed to start automatically based on the received URL generated in response to the triggered event.

16. The at least one non-transient computer readable medium of claim 15 wherein the at least one automated process is marked idle.

17. The at least one non-transient computer readable medium of claim 15 wherein the at least one automated process is a set of automated processes and the based on the input of the generated URL, resuming the set of automated processes.

18. The at least one non-transient computer readable medium of claim 15 wherein the running workflow process is a centralized running workflow process.

19. The at least one non-transient computer readable medium of claim 15 wherein the running workflow process is a long term running workflow process.

20. The at least one non-transient computer readable medium of claim 15 wherein receiving of the input of the generated URL is in response to a business event determined by the external system/application.

* * * * *